US011909889B2

(12) United States Patent
Ray et al.

(10) Patent No.: US 11,909,889 B2
(45) Date of Patent: *Feb. 20, 2024

(54) SECURE DIGITAL SIGNING

(71) Applicant: Microsoft Technology Licensing, LLC, Redmond, WA (US)

(72) Inventors: Mayukh Ray, Sammamish, WA (US); Tolga Acar, Sammamish, WA (US); Timothy Michael Peters, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/740,254

(22) Filed: May 9, 2022

(65) Prior Publication Data

US 2022/0417031 A1 Dec. 29, 2022

Related U.S. Application Data

(63) Continuation of application No. 17/097,790, filed on Nov. 13, 2020, now Pat. No. 11,368,314.

(51) Int. Cl.
*H04L 9/32* (2006.01)
*H04L 9/08* (2006.01)
*H04L 9/30* (2006.01)

(52) U.S. Cl.
CPC .......... *H04L 9/3247* (2013.01); *H04L 9/0825* (2013.01); *H04L 9/0877* (2013.01); *H04L 9/302* (2013.01); *H04L 9/3213* (2013.01)

(58) Field of Classification Search
CPC ..... H04L 9/0825; H04L 9/0877; H04L 9/302; H04L 9/3213; H04L 9/3247
See application file for complete search history.

(56) References Cited

U.S. PATENT DOCUMENTS 8,615,663 B2 * 12/2013 Buer ................... H04L 63/0823
713/168
8,904,182 B2 * 12/2014 Bardera Bosch ..... G06F 21/645
713/168

(Continued)

OTHER PUBLICATIONS

"Aciobanitei, et al.; Light weight Version of SQRL Authentication Protocol Based on Cryptography in the Cloud; In Proceedings of IEEE 12th International Symposium on Applied Computational Intelligence and Informatics (SACI); May 17, 2018, pp. 000173-000178."*

*Primary Examiner* — Mohammad A Siddiqi
(74) *Attorney, Agent, or Firm* — Workman Nydegger

(57) ABSTRACT

A public-private key cryptographic scheme is described for granting authenticating a client to a remote device or service in order to access a secure resource. The client is provided the public key, but the private key is stored in a hardware security module (HSM) that the client is not able to access. The client requests a digital signature be generated from the private key from a secure vault service. The secure vault service accesses the HSM and generates the digital certificate, which is then passed to the client. The digital certificate may be added to a security token request submitted to an identity provider. The identity provider determines whether the digital signature came from the private key. If so, the identity provider provides authenticates the client and provides an access token that is usable by the client for authentication to the remote device with the secure resource 20 Claims, 5 Drawing Sheets

(56) References Cited

U.S. PATENT DOCUMENTS

| | | | |
|---|---|---|---|
| 10,122,529 B2* | 11/2018 | Chandrasekaran | ........................... H04L 63/0823 |
| 10,771,256 B2* | 9/2020 | Seegebarth | ......... H04W 12/068 |
| 11,323,274 B1* | 5/2022 | Bowen | .................. H04L 9/0897 |
| 11,368,314 B2* | 6/2022 | Ray | ....................... H04L 9/0825 |
| 2015/0186657 A1* | 7/2015 | Nakhjiri | ................ H04L 9/0825 713/193 |
| 2016/0028548 A1* | 1/2016 | Yao | ....................... H04L 9/3247 713/176 |
| 2017/0214662 A1* | 7/2017 | Chu | ...................... H04L 9/0841 |
| 2018/0034646 A1* | 2/2018 | Kuramoto | ............. H04L 9/3268 |
| 2020/0186359 A1* | 6/2020 | Chan | .................... H04L 9/3273 |
| 2021/0119807 A1* | 4/2021 | Chen | .................... H04L 9/3242 |

* cited by examiner

SECURE DIGITAL SIGNING

CROSS-REFERENCE TO RELATED APPLICATION

This application is a continuation application of and claims priority to U.S. patent application Ser. No. 17/097,790, entitled "SECURE DIGITAL SIGNING," filed on Nov. 13, 2020, the disclosure of which is incorporated herein by reference in its entirety.

BACKGROUND

A digital signature is a mathematical scheme for verifying the authenticity of digital messages or documents. A valid digital signature, where the prerequisites are satisfied, gives a recipient reason to believe that the message was created by an authentic known sender and that the message was not altered in transit. Digital signatures are a standard element of most cryptographic protocol suites, and are commonly used for software distribution, financial transactions, contract management software, and other uses where it is important to detect forgery or tampering.

Most digital resources are shared and accessible online. Everything from software applications to cloud services and databases are largely hosted on servers that are accessible over a network. Before resources can be shared, devices and the users must be authenticated. Authentication algorithms require digital signatures that mainly use public-private key pairs to authenticate a client requesting a digital resource. To generate a valid digital signature, conventional authentication protocols today require a client to use a private key to generate the digital signature, and then an identity provider determines whether to authenticate the client based on the identity provider's verification of the signature with a public key. In other words, the client must know the private key to generate the digital signature to be authenticated by the identity provider, or any other service.

Yet, the client must know the private key to properly generate the digital signature. Today's authentication protocols freely provide private cryptographic keys to clients, which, in turn, store them locally and use them to generate the digital signatures. But clients are typically the most vulnerable devices for hacking. They typically do not have very robust security, at least compared with modern cloud services. Entrusting private keys to clients threatens the authentication process because clients are more prone to attack and hacking, and once the private key is obtained, other devices may surreptitiously be authenticated and gain access to restricted online resources.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Examples and embodiments disclosed herein are directed to authenticating a client device or service (client) to a remote device or service in order to access a secure resource thereon. The client uses a public-private key cryptographic technique to obtain an access token that authenticates the client to the remote device or service. In the disclosed public-private key cryptographic technique, the public key is shared with the client but the private key is kept stored away from the client in a hardware security module (HSM) that is only accessible by a secure vault service. Instead of sharing the private key with the client, which may be hacked, the client is provided a digital signature that the secure vault generates from the private key in the HSM. The digital signature is generated using an access token request. The generated digital signature is configured to validate the access token access request, but if either is altered (access token request or digital signature), the digital signature validation fails.

The digital signature is passed to the client—without the private key itself—and the client attaches the digital signature to a request for the access token asked of an identity provider service. In response to the request with the private key-generate digital signature, the access token for the remote server or service is provided that the client may use to access the secure resource. Thus, the client is identified as authorized to access the secure resource by the identity provider using a digital signature generated from an HSM-locked private key that the client never accesses. These tokens may be used for service-to-service or communications as well as for client-to-service authorization.

BRIEF DESCRIPTION OF THE DRAWINGS

The disclosed examples are described in detail below with reference to the accompanying drawing figures listed below.

DETAILED DESCRIPTION

Figure 1:
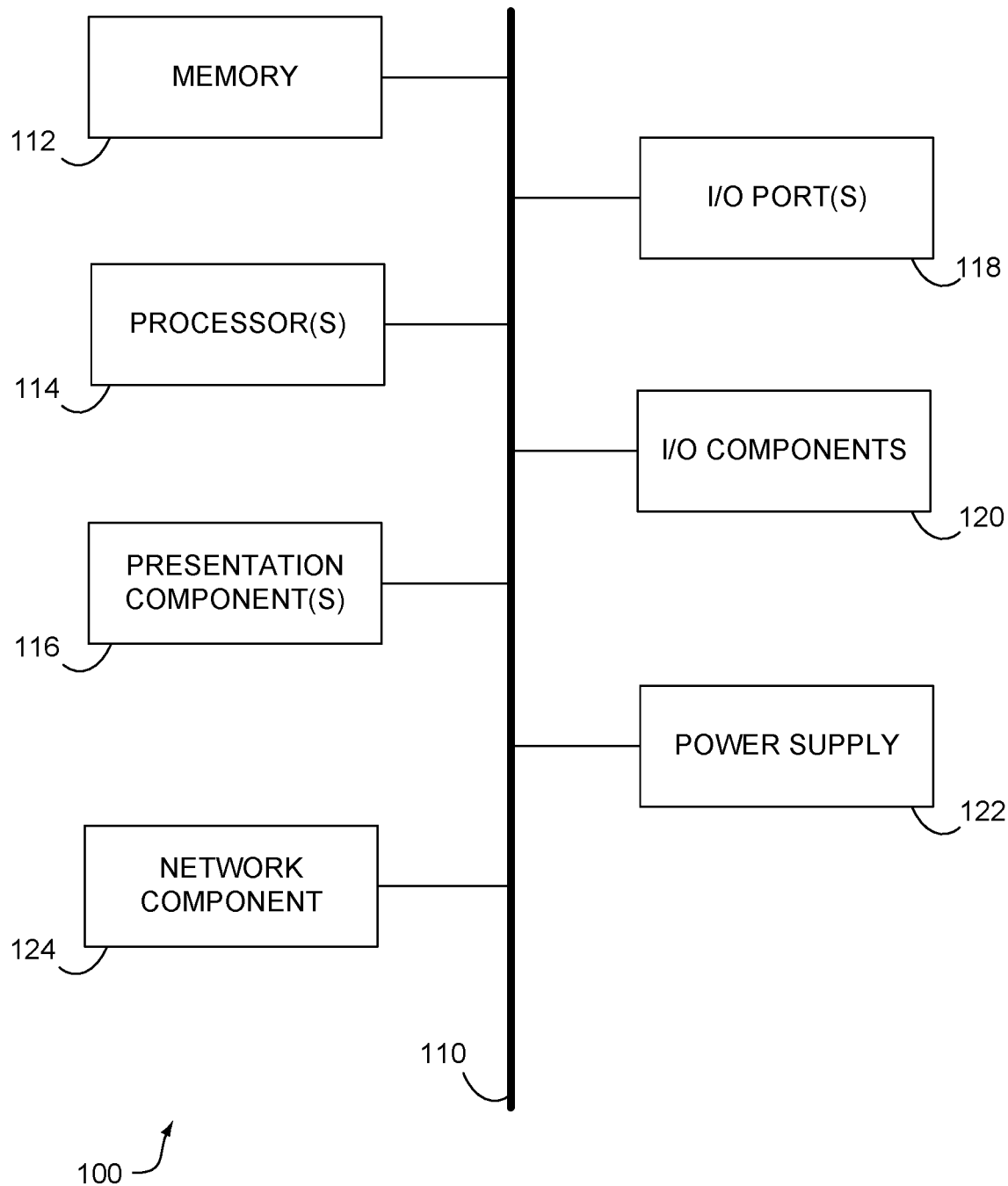
FIG. 1 is a block diagram of an example computing environment suitable for implementing some of the various examples disclosed herein.

The various embodiments will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

As previously discussed, today's authentication protocols share private cryptographic keys (private keys) with client devices so that the client devices are able to generate digital signatures for use in accessing restricted online software and data resources. This approach, while helpful from an authentication standpoint, provides a vulnerability in that the client devices may be hacked or compromised and the cryptographic private keys stolen. The disclosed embodiments provide systems, methods, and techniques for authenticating a client.

Instead of sharing private keys with clients looking to be authenticated the disclosed embodiments and examples do not share the private keys with the clients and instead store private keys in a remote HSM that is used to generate authenticating signatures for the client. The clients may then attach these remote-generated digital signatures to access tokens that are used to authenticate the clients to an identity provider. The private keys are only kept in the HSM and never exposed to the clients, protecting the integrity of the private keys by removing the risk that the private keys may be hacked from the clients.

In some embodiments, a client seeking to access a remote resource interacts with two online services (an identity provider and a secure vault) to be properly authenticated. In these embodiments, the client requests and receives a public key from the secure vault. The client uses the public key to generate an initial security token that includes a client identifier (client ID) and the public key. This initial security token (client ID and public key) is sent to the secure vault service. The secure value submits the initial security token to an HSM storing a private key, and the HSM signs the initial security token with the private key to generate a digital signature for the client. This digital signature generated using the client ID, the public key, and the private key is sent back to the client, which may, in turn, use the digital signature to request an access token from the identity provider to access the resource. The digital signature sent to the client is generated from but does not include the private key. Thus, the private key is kept secure in the HSM and never provided to the client.

The clients disclosed herein may refer to either end client computing devices or to other web- and cloud-services. Some particular embodiments focus on service-to-service communications, authenticating one web- or cloud-service to another web- or cloud-service before providing access to a secure resource. The terms "clients" and "client devices" include both end devices and computing services.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media devices and communication media. Computer storage media devices include volatile and nonvolatile, removable and non-removable memory implemented in any method or technology for storage of information such as computer readable instructions, data structures, program modules, or the like. Computer storage media devices are tangible and mutually exclusive to communication media. Computer storage media devices are implemented in hardware and exclude carrier waves and propagated signals. Computer storage media devices for purposes of this disclosure are not signals per se. Example computer storage media devices include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

Having generally provided an overview of some of the disclosed examples, attention is drawn to the accompanying drawings to further illustrate some additional details. The illustrated configurations and operational sequences are provided for to aid the reader in understanding some aspects of the disclosed examples. The accompanying figures are not meant to limit all examples, and thus some examples may include different components, devices, or sequences of operations while not departing from the scope of the disclosed examples discussed herein. In other words, some examples may be embodied or may function in different ways than those shown.

FIG. 1 is a block diagram of an example computing device 100 for implementing aspects disclosed herein, and is designated generally as computing device 100. Computing device 100 is but one example of a suitable computing environment and is not intended to suggest any limitation as to the scope of use or functionality of the disclosed embodiments and examples. Neither should the computing device 100 be interpreted as having any dependency or requirement relating to any one or combination of components/modules illustrated.

Specifically, computing device 100 includes a bus 110 that directly or indirectly couples the following devices: computer-storage memory 112, one or more processors 114, one or more presentation components 116, input/output (I/O) ports 118, I/O components 120, a power supply 122, and a network component 124. Computer device 100 should not be interpreted as having any dependency or requirement related to any single component or combination of components illustrated therein. While computer device 100 is depicted as a seemingly single device, multiple computing devices 100 may work together and share the depicted device resources. For instance, computer-storage memory 112 may be distributed across multiple devices, processor(s) 114 may provide housed on different devices, and so on.

Bus 110 represents what may be one or more busses (such as an address bus, data bus, or a combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. Such is the nature of the art, and reiterate that the diagram of FIG. 1 is merely illustrative of an exemplary computing device that can be used in connection with one or more embodiments of the present invention. Distinction is not made between such categories as "workstation," "server," "virtual machine" (or VM), "laptop," "hand-held device," etc., as all are contemplated within the scope of FIG. 1 and the references herein to a "computing device."

Computer-storage memory 112 may take the form of the computer-storage media references below and operatively provide storage of computer-readable instructions, data structures, program modules and other data for the computing device 100. For example, computer-storage memory 112 may store an operating system, a universal application platform, or other program modules and program data. Computer-storage memory 112 may be used to store and access instructions configured to carry out the various operations disclosed herein.

As mentioned below, computer-storage memory 112 may include computer-storage media in the form of volatile and/or nonvolatile memory, removable or non-removable memory, data disks in virtual environments, or a combination thereof. And computer-storage memory 112 may include any quantity of memory associated with or accessible by the display device 100. The memory 112 may be internal to the display device 100 (as shown in FIG. 1), external to the display device 100 (not shown), or both (not shown). Examples of memory 112 in include, without limitation, random access memory (RAM); read only memory (ROM); electronically erasable programmable read only memory (EEPROM); flash memory or other memory technologies; CDROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the display device 100. Additionally or alternatively, the computer-storage memory 112 may be distributed across multiple display devices 100, e.g., in a virtualized environment in which instruction processing is carried out on multiple devices 100. For the purposes of this disclosure, "computer storage media," "computer-storage memory," "memory," and "memory devices" are synonymous terms for the computer-storage media 112, and none of these terms include carrier waves or propagating signaling.

Processor(s) 114 may include any quantity of processing units that read data from various entities, such as memory 112 or I/O components 120. Specifically, processor(s) 114 are programmed to execute computer-executable instructions for implementing aspects of the disclosure. The instructions may be performed by the processor, by multiple processors within the computing device 100, or by a processor external to the client computing device 100. In some examples, the processor(s) 114 are programmed to execute instructions such as those illustrated in the flowcharts discussed below and depicted in the accompanying drawings. Moreover, in some examples, the processor(s) 114 represent an implementation of analog techniques to perform the operations described herein. For example, the operations may be performed by an analog client computing device 100 and/or a digital client computing device 100.

The embodiments and examples include executable instructions that cause the processor 114 to function as a specific processing unit capable of carrying out cryptographic features discussed herein. For example, various instructions are disclosed herein that cause the processor 114 to transform into a specific processor 114 for accessing private keys in HSMs, generating digital signatures from the HSM-stored private keys, adding the digital signatures to security tokens, and/or using the security tokens for authentication purposes. When specifically programmed for such tasks, the disclosed processors 114 operate more securely by eliminating the ability of outside hackers to be able to obtain important cryptographic private keys from clients, thereby preserving the integrity of cryptographic public-private key pairings.

Presentation component(s) 116 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 100, across a wired connection, or in other ways.

Ports 118 allow computing device 100 to be logically coupled to other devices including I/O components 120, some of which may be built in. Examples I/O components 120 include, for example but without limitation, a microphone, joystick, game pad, satellite dish, scanner, printer, wireless device, etc.

Figure 2:
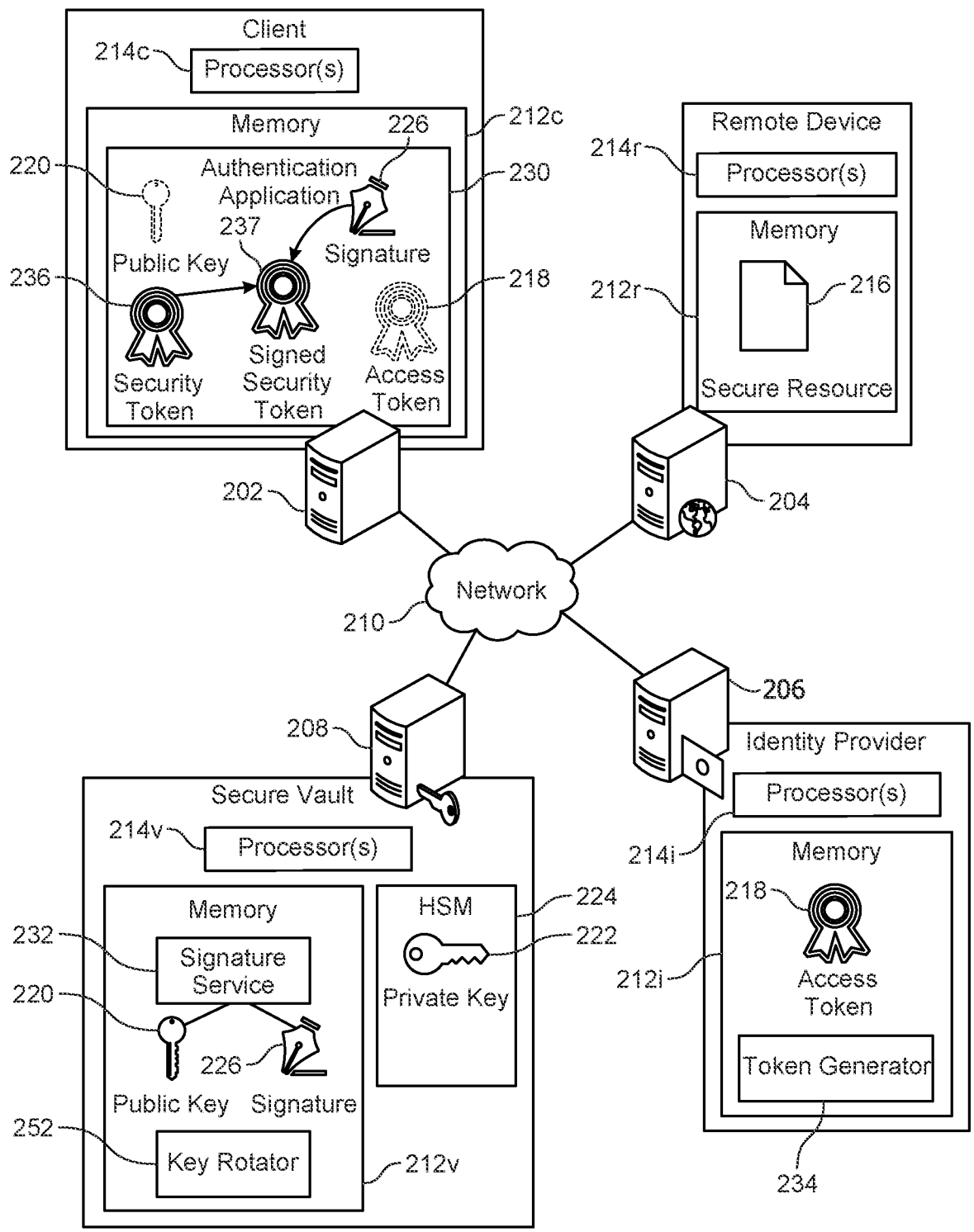
FIG. 2 illustrates a block diagram of a networking environment for allowing a client to access a secure resource on a remote device using the disclosed cryptographic techniques, according to some of the disclosed embodiments.
Figure 3:
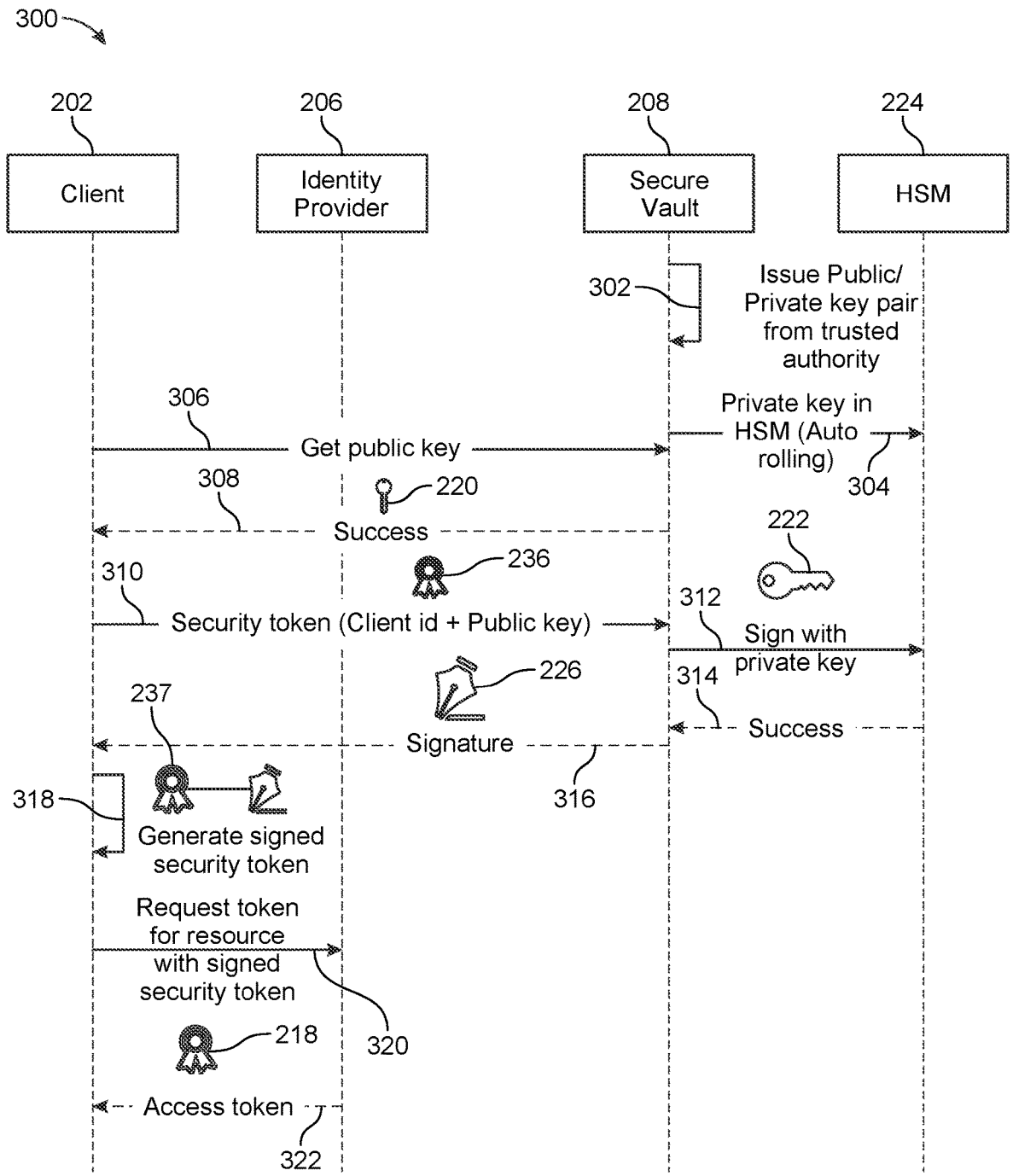
FIG. 3 illustrates a flow diagram of an operational workflow for cryptographically authenticating a client to access a secure resource on a remote device, according to some of the disclosed embodiments.

The computing device 100 may operate in a networked environment via the network component 124 using logical connections to one or more remote computers, such as those shown in FIGS. 2 and 3. In some examples, the network component 124 includes a network interface card and/or computer-executable instructions (e.g., a driver) for operating the network interface card. Communication between the computing device 100 and other devices may occur using any protocol or mechanism over any wired or wireless connection. In some examples, the network component 124 is operable to communicate data over public, private, or hybrid (public and private) using a transfer protocol, between devices wirelessly using short range communication technologies (e.g., near-field communication (NFC), BLUETOOTH branded communications, or the like), or a combination thereof.

FIG. 2 illustrates a block diagram of a networking environment 200, according to some of the disclosed embodiments. Networking environment 200 involves a client 202, a remote device 204, an identify provider 206, and a secure vault 208 that are connected to a network 210. Each of these (202-208) represent a server or online service configured to perform the disclosed actions. While depicted as different servers for clarity, one skilled in the art will understand that the client 202, remote device 204, identity provider 206, and secure vault 208 may be online services that are hosted by the same computing device. For example, the identity provider 206 and the secure vault 208 may be part of the same cloud environment that is hosted on the same collection of physical servers or VMs. The depicted devices are provided merely for explanatory purposes and are not meant to limit all examples to any particular set or type of devices.

The client 202, remote device 204, identity provider 206, and secure vault 208 may include the previously discussed hardware, middleware, and software components of computing device 100 in FIG. 1. In particular, the client 202, remote device 204, identity provider 206, and secure vault 208 have include, or have access to, one or more processors 214c/memory212c, 214r/memory212r, 214i/memory212i, 214v/memory212v, respectively. These processing and memory resources may be shared or separate from each other.

The network 210 includes any public or private infrastructure for transferring data. Examples of computer networks 210 include, without limitation, a wireless network, landline, cable line, cellular, fiber-optic line, local area network (LAN), wide area network (WAN), or the like. Such networks may comprise subsystems that transfer data between servers or computing devices 100. For example, the network 210 may also include a point-to-point connection, the Internet, an Ethernet, a backplane bus, an electrical bus, a neural network, or other internal system. These networking infrastructures are generally known and need not be discussed at length herein.

In operation, the client 202 is attempting to access a secure resource 216 from the remote device 202. The secure resource 216 may be any type of file, application, package, data, access point, software, or hardware resource. Examples include, without limitation, a new version of an application, data sets for machine learning algorithms, a raster package for images, an Internet of Things (IoT) device, a hypervisor for VMs, an online application, or the like. Virtually any software, middleware, or hardware resource available over the Internet may be accessed if the proper authentication is provided.

To access the secure resource 216, the client 202 needs to obtain or generate the proper access token 218. In operation, the authentication application 230 generates the access token 218 using a public key 220 and a digital signature 226 that is generated by the secure vault 208 in the manner described below. The public key 220 is stored memory 212$v$ of the secure vault 208, and the private key 222 is stored in an HSM 224 of the secure vault 208, or which the secure vault 208 is able to access. As shown by the dotted outline of the public key 220 in the client 202, only the public key 202 is shared with the client 202.

The private key 222 is not shared and remains in the HSM 224. Instead, a signature service 232 on the secure vault 208 accesses the private key 222 in the HSM 224 and generates a signature 226 from the private key 222 that is sent to the client 202 and may be paired with the public key 220. In some embodiments, an access token request is sent as an unsigned JSON Web Token (JWT). And the un-signed JWT access token request is signed to create an issued JSON Web Signature (JWS) that is generated using the private key 222. This JWS is the digital signature 226, in some embodiments. In sum, the unsigned JWT is sent to the signature service 232, and the signed JWS is returned as the digital signature 226. Other embodiments use different private key-generated cryptographic signatures, including, for example but with limitation, digital signatures for RSA®, Elliptic Curve Cryptography (ECC), Digital Security Algorithm (DSA), or asymmetric cryptography algorithm.

In some embodiments, operations for obtaining the public key 220 and generating the digital signature 226 are carried out by an authentication application 230 on the client 202 and a signature service 232 on secure vault 208. Additionally, the identity provider 206 includes a token generator 234 for generating the access token 218 for the client 202 to access the secure resource 216. The authentication application 230, the signature service 232, and the token generator 234 are executable instructions, middleware, and/or hardware configured to specifically cause respective processors 214$c$, 214$v$, and 214$i$ to generate and exchange the public key 220, the digital signature 226, a security token 236, a signed security token 237, and the access token 218 between the client 202, identity provider 206, and the secure vault 208, without exposing the private key 222 outside of the HSM 224. The operation flow for generating the access token 218 is shown in FIG. 3 and described in more detail below. Once generated, the access token 218 allows the client 202 to access the secure resource 204 on the remote device 204.

Some embodiments change the private key 222, e.g., periodically (e.g., hourly, daily, monthly, etc.) or conditionally (e.g., based on a detected security breach). Traditionally, changing a private key was a manual process that required an administrative user to create a new private key and then change it at a point where minimal impact would be felt. For example, if the private key was taken down for a significant period of time, there would be negative impact to the cryptographic functions that rely on the private key. To seamlessly change the private key 222, the secure vault 208 includes a key rotator 252 that issues a new private key 222. Once a new private key is generated, the previous private key 222 is replaced in the HSM 224 with the new private key 222. Automated private key rotation and certificate issuance is integrated to remove the burden of manual certificate renewals from administrators. The private keys 222 are rotated automatically without any process outage and without any user interaction.

FIG. 3 illustrates a flow diagram of an operational workflow 300 for cryptographically authenticating the client 202 to access the secure resource 216 on the remote device 204, according to some of the disclosed embodiments. Initially, the secure vault 208 issues a public/private key pair comprising the public key 220 and the private key 222. This issuance may be directly performed by the secure vault 208 or received from another cloud online, shown as the Trusted Authority. The public key 220 is stored in memory 212$v$ of the secure vault 208. As shown at 304, the private key 222 is stored in the HSM 224, where it is kept and not shared, protecting the integrity of the private key 222 by removing the risk that it may be hacked from the client 202. In some embodiments, the private key 222 is automatically rotated from time to time, and thus may be considered "autorolling."

To authenticate the client 202, the authentication application 230 of the client 202 first retrieves the public key 220 from the secure vault 208, as shown at 306—if the client 202 does not already have the public key 202 stored. The secure vault 208 provides the public key 220 in success message back to the client 202, as shown at 308. The authentication application 230 generates the security token 236, which, in some embodiments, is a JSON web token (or "JWT" token). In some embodiments, the security token 236 includes a client ID specific to either a user, account, or specific device identifier associated with the client 202 and the public key 220—or at least a hash value based on the public key 220.

To create the access token 218, the security token 236 needs to be signed with the digital signature 226 generated from the private key 222. With the private key 222 in the HSM 224, the authentication application 230 sends the security token 236 to the secure vault 208 so that the digital signature 226 may be generated, as shown at 310. The secure vault 208 accesses the HSM 224 and generates the digital signature 226 for the security token 236, as shown at 312. The HSM 224 responds with the digital signature 226 and a success message when the digital signature 226 is generated, as shown at 314, providing the secure vault 208 with the digital signature 226. The secure vault 208 provides the digital signature 226 to the client 202. The client 202 adds the digital signature 226 to the security token 226 to generate the signed security token 237, as shown at 318. In some embodiments, the signed security token 237 is a signed JWT token with a JWS digital signature 226 added.

The client 202 provides access token 218 to the identity provider 206 and requests the access token 218, as shown at 320. If the correct digital signature 236 is found in the signed security token 237, the identity provider 206 provides the access token 218, as shown at 322. If not, however, the access token 218 is not provided. Thus, the client 202 is able to receive the access token 218 by only having to provide the digital signature 226—in the signed security token 237—that is generated from the private key 222 in the HSM 224. The client 202 does not have to possess or know the private key 220. Instead, just the digital signature 226 generated from the private key 222 in the HSM 224 is needed, allowing the private key 222 to be remotely and securely stored away from the client 202. As a result, the risk to the integrity of the private key stemming from attacks on the client 202 are eliminated. This guarantees that the user/service requesting access to the secure resource 216 lacks access to the private key 222 trusted by the identity provider 206.

This initial security token (client ID and public key) is sent to the secure vault service. The secure value submits the initial security token to an HSM storing a private key, and the HSM signs the initial security token with the private key to generate a digital signature for the client 202. This digital signature 226 generated using the client ID, the public key, and the private key is sent back to the client 202, which may, in turn, use the digital signature to request an access token from the identity provider to access the resource The digital signature 226 sent to the client 202 is generated from but does not include the private key. Thus, the private key is kept secure in the HSM and never provided to the client 202.

The following text shows one example of the signed security token 237, which includes a client ID, a client_assertion_type, a client assertion, and a grant type:

HTTPCopy
POST/{tenant}/oauth2/v2.0/token HTTP/1.1
Host: login.microsoftonline.com
Content-Type: application/x-www-form-urlencoded
scope=https%3A%2F%2Fgraph. microsoft. com%2F. default
&client_id=97e0a5b7-d745-40b6-94fe-5f77d35c6e05
&client_assertion_type=urn%3Aietf%3Aparams%3A oauth%3Aclient-assertion-type%3Ajwt-bearer
&client_assertion=eyJhbGciOiJSUzI1NiIsIng1dCI6I md4OHRHeXN5amNScUtqR1BuZDdSRnd2d1pJ MCJ9.eyJ{a lot of characters here}M8U3bSUKKJDEg
&grant_type=client_credentials Table 1 below provides definitions for the various parts of this example access token 218:

| Parameter | Description |
| --- | --- |
| tenant | The directory tenant the application plans to operate against, in Globally Unique Identifier (GUID) or domain-name format. |
| client_id | The client ID assigned to an application. |
| scope | The value passed for the scope parameter in this request should be the resource identifier (application identifier uniform resource identifier (URI)) of the resource you want, affixed with the .default suffix. This value informs the identity provider 206 that of all the direct application permissions configured for an application, a token should be issued for the ones associated with requested resources. |
| client_assertion_type | Set to different types, for example urn:ietf:params:oauth:client-assertion-type:jwt-bearer. |
| client_assertion | The digital signature 226 generated by the private key 222 |
| grant_type | Set to indicate that the message contains client credentials. |

This particular example has the digital signature 226, which is generated by the secure vault 208 from accessing the private key 226. This is but one example of the signed security token 237.

Figure 4:
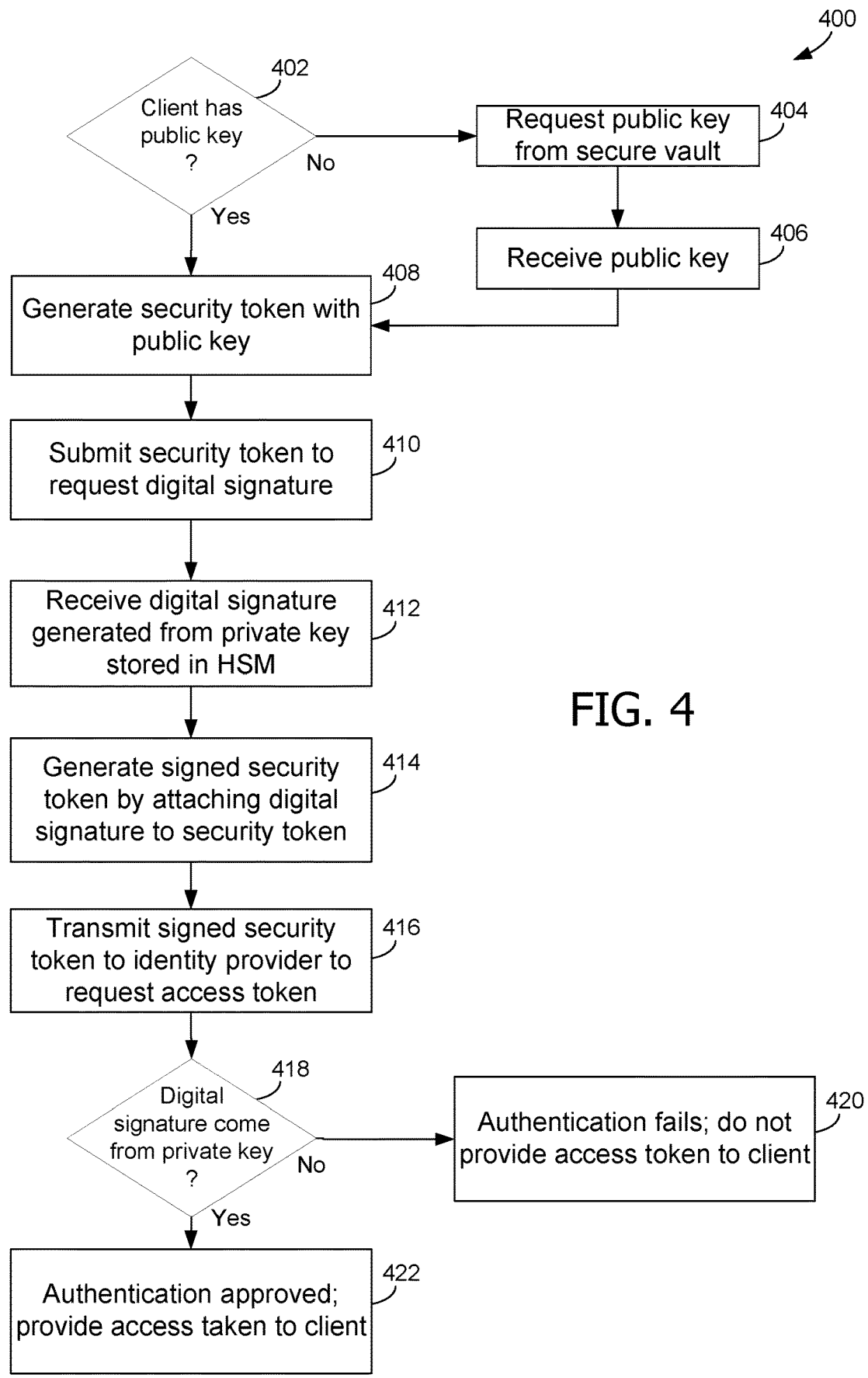
FIG. 4 illustrates a flowchart diagram illustrating an operational workflow for issuing cryptographic tokens to authenticate the client, according to some of the disclosed examples.

FIG. 4 illustrates a flowchart diagram illustrating an operational workflow 400 for issuing cryptographic tokens to authenticate the client 202, according to some of the disclosed examples. The client 202 checks whether it has access to the public key 220, as shown at 402. If not, the client 202 requests and receives the public key 220 from the secure vault 208, as shown at 404 and 406. As shown at 408, the client 202 generates the security token 236 with the public key 220 and a client ID associated with the client 202 or a user of the client 202. The security token 236 is submitted to the secure vault 208, requesting a digital signature 226 to be generated from the private key 222, as show at 410. As previously discussed, the private key 222 is stored in an HSM 224 away from and non-accessible to the client 202; so the client 202 requests the digital signature 236 to for authentication to the identity provider 208 that is able to supply the access token 218 for the remote device 204 with the secure resource 216. The secure vault 208 receives the security token 236 from the client 202, accesses the HSM 224 with the private key 222, and generates the digital signature 226 from the private key 222. Or, in other embodiments, the digital signature 226 is the generated in the HSM 224, which may or may not be part of the secure vault 208.

The secure vault 208 transmits the digital signature 226 back to the client 202. A shown at 412, the client 202 receives the digital signature 226. The client 202 generates the signed security token 237 that may be used to the authenticate the client 202 to the identity provider 208. The signed security token 237 is transmitted to the identity provider 208, as shown at 416. The identity provider 208 analyzes the signed security token 237 to check whether the digital signature 226 was generated from the private key 222. This may be done by the secure vault 208 sharing the private key 222 with the identity provider 208 (in some embodiments), sharing another digital signature generated from the private key 222 with the identity provider 208 (in other embodiments), or the identity provider 208 submitting the digital signature 226 of the signed security token 237 from the client 202 to the secure vault 208. If the identity provider 208 is not able to authenticate the digital signature 226 of the signed security token 237 as coming from the private key 222, authentication fails, and no access token 218 is provided to the client 202, as shown at 420. If the identity provider 208 is able to authenticate the digital signature 226 of the signed security token 237 as coming from the private key 222, authentication is approved by the identity provider 208, and the access token 218 is provided to the client 202, as shown at 422. Once this access token 218 is generated and provided to the client 202, the client 202 has effectively been authenticated to access the secure resource 216 for a limited time and, in some embodiments, needs only to provide the access token 218 to the remote device 204, which, in turn, trusts that the client 202 was authenticated due from possession of a valid access token 218.

Figure 5:
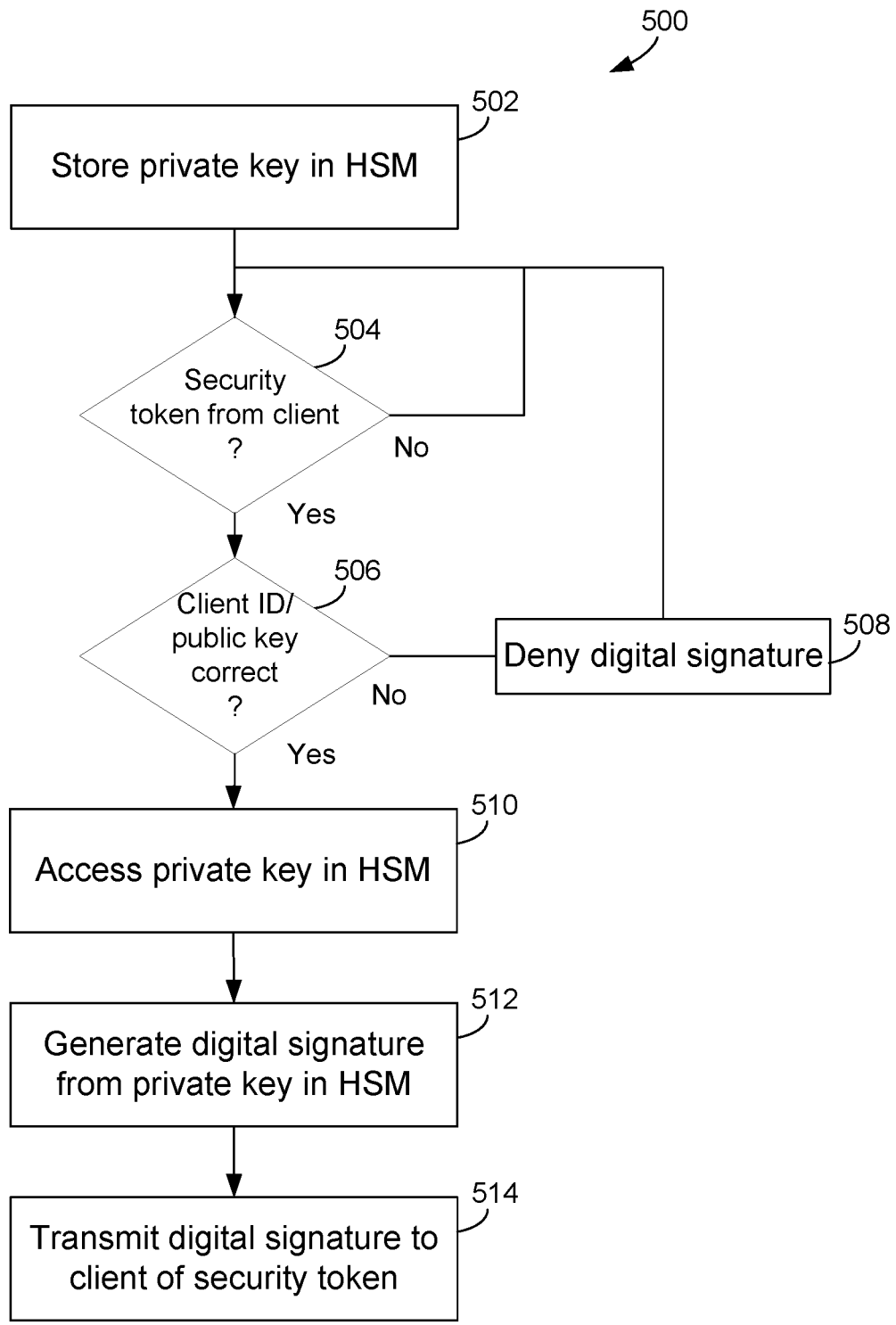
FIG. 5 illustrates a flowchart diagram illustrating an operational workflow for generating digital signatures from private keys stored in an HSM, according to some of the disclosed embodiments.

FIG. 5 illustrates a flowchart diagram illustrating an operational workflow 500 for generating digital signatures 226 from private keys stored in an HSM, according to some of the disclosed embodiments. As shown at 502, the private key 222 is stored in an HSM 224. The HSM 224 may be part of the secure vault 208 or remotely stored and accessible by the secure vault 208. The secure vault 208 waits until a client 202 requests a digital signature 226 by sending the security token 236, as shown at 504. As previously discussed, the security tokens 236 include a client ID and an indication of the public key 220. For example, the client 202 may generate a hash value based on the public key 220, and the secure vault 208 may be able to determine whether the hash value was, in fact, based on the public key 220. Alternately, the public key 220 itself may be sent.

Regardless of how the public key 220 is indicated, the secure vault 208 uses another authentication mechanism than the private key 222 (e.g., a stored certificate, public key 220, password, token, or other authentication mechanism) that allows the secure vault 208 to trust the client 202. In this vein, some of the disclosed embodiments use a user secret (e.g., certificate, password, token, etc.) to get to the HSM 224, which then issues the digital signature 226 based on the private key 222 to get to the secure resources resource 216. Thus, the HSM 224 ensures that the private key 222 is never stolen so that access to secure resources 216 is always temporary and can be revoked immediately upon compromise of the first user secret.

In some embodiments, if the additional authentication mechanism (e.g., certificate, public key 220, password, token, etc.) are not able to be verified, the secure vault 208 denies the request for the digital signature 226, as shown at 508. If the additional authentication mechanism is verified, the secure vault 208 requests the digital signature 226 from the HSM, which generates the digital signature 226 using the private key 222 in the HSM 224, as shown at 510. The digital signature 226 may then be generated, either by the secure vault 208 or the HSM 224, as shown at 512. The digital signature is transmitted back to the client that sent the verified security token 236, as shown at 514. The client 202 may then use the digital signature 226 to obtain the access token 218 using the techniques discussed herein.

The examples and embodiments disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The discloses examples may be practiced in a variety of system configurations, including personal computers, laptops, smart phones, mobile tablets, hand-held devices, consumer electronics, servers, VMs, specialty computing devices, etc. The disclosed examples may also be practiced in distributed computing environments where tasks are performed by remote-processing devices that are linked through a communications network.

Additional Embodiments

Some embodiments are directed to a method for authenticating a client to access a secure resource on a remote device using a public key and a private key, wherein the private key is stored in a HSM away from the client. The method comprises: generating, at the client, a security token comprising a client identifier and the public key; requesting, at the client, a digital signature generated from the private key stored in the HSM, wherein the HSM is located away from the client; receiving, at the client, the digital signature generated from the private key stored in the HSM; attaching, at the client, the digital signature to the security token to generate a signed security token; transmitting, from the client, the signed security token to the identity provider in a request for the access token; and receiving, at the client, the access token from the identity provider, wherein the access token usable for accessing the secure resource on the remote device.

In some embodiments, the security token comprises a JSON web token (JWT).

In some embodiments, the digital signature comprises a JSON Web Signature (JWS).

Some embodiments also include requesting the public key from a secure vault that is remote from the client.

Some embodiments also include modifying the private key in the HSM.

In some embodiments, the digital signature is generated from an asymmetric cryptography algorithm using the private key.

In some embodiments, the asymmetric cryptography algorithm comprises an at least one of RSA®, Elliptic Curve Cryptography (ECC), or Digital Security Algorithm (DSA).

In some embodiments, client comprises a first cloud service attempting to access the secure resource at a second cloud service.

In some embodiments, the secure resource comprises a file to be downloaded to the client.

In some embodiments, the access token comprises a client assertion portion that is generated from the private key.

In some embodiments, the private key is not shared with the client.

In some embodiments, the private key is not shared outside of the HSM.

Other embodiments are directed to a system for generating a digital signature from a private key being stored in a hardware security module to be used in authenticating a client to access a secure resource on a remote device. The system comprises: memory embodied with executable instructions for accessing the HSM to generate the digital signature from the private key upon request of the client; and at least one processor programmed to: receive, at a secure vault, a security token comprising a client identifier associated with the client or a user of the client, generate the digital signature from the private key stored in the HSM, and transmit the digital signature generated from the private key stored in the HSM to the client for use, by the client, to obtain an access token to a secure resource on a remote device.

In some embodiments, the digital signature is attached to a security token generated by the client to create a signed signature token for use by the client to obtain the access token.

In some embodiments, the digital signature comprises a JSON Web Signature (JWS).

In some embodiments, the at least one processor is further programmed to wait a predetermined period of time to change the private key in the HSM; incident to expiration of the period of time, issue a new private key; and replace the private key in the HSM with the new private key.

In some embodiments, the at least one processor is further programmed to seamlessly rotate the private key in the HSM with a new private key without user interaction, wherein the private key is replaced with the new private key in a seamless manner for reducing impact to generating digital signatures.

In some embodiments, the private key is not shared with the client.

Other embodiments are directed to computer-storage memory embodied with executable instructions executable that cause one or more processors to perform operations for authenticating a client to access a secure resource on a remote device using a public key and a private key, wherein the private key is stored in an HSM away from the client. The operations comprise: generating, at the client, a security token comprising a client identifier and the public key; requesting, at the client, a digital signature generated from the private key stored in the HSM, wherein the client does not have access to the HSM; receiving, at the client, the digital signature generated from the private key; attaching, at the client, the digital signature to the security token to generate a signed security token; transmitting, from the client, the signed security token to an identity provider in a request for the access token; receiving, at the client, the access token that is usable to access the secure resource on the remote device; and storing the access token on the client.

Some embodiments also include operations for transmitting the access token to the remote device and receiving the secure resource incident to the remote device authenticating the client with the access token.

While the aspects of the disclosure have been described in terms of various examples with their associated operations, a person skilled in the art would appreciate that a combination of operations from any number of different examples is also within scope of the aspects of the disclosure.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure.

In embodiments involving a general-purpose computer, aspects of the disclosure transform the general-purpose computer into a special-purpose computing device when configured to execute the instructions described herein.

The embodiments illustrated and described herein as well as examples not specifically described herein but within the scope of aspects of the disclosure constitute exemplary means for authenticating a client to access a secure resource on a remote device using a public key and a private key when the private key is stored in an HSM away from, and not accessible by, the client. For example, the elements illustrated in FIGS. 2-3, such as when encoded to perform the operations illustrated in FIG. 4-5, constitute exemplary means for generating, at the client, a security token comprising a client identifier and the public key; exemplary means for requesting, at the client, a digital signature generated from the private key stored in the HSM, wherein the client does not have access to the HSM; exemplary means for receiving, at the client, the digital signature generated from the private key; exemplary means for attaching, at the client, the digital signature to the security token to generate a signed security token; exemplary means for transmitting, from the client, the signed security token to an identity provider in a request for the access token; exemplary means for receiving, at the client, the access token that is usable to access the secure resource on the remote device; and exemplary means for storing the access token on the client.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method for authenticating a client to access a secure resource on a remote device using a public key and a private key, the method comprising:
   storing the private key in a hardware security module (HSM);
   receiving a request from the client for a digital signature to access the secure resource;
   generating the digital signature using, in part, the private key in the HSM;
   generating a security token using the digital signature;
   authenticating the client to access the secure resource using the security token;
   determining to change the private key in the HSM;
   issuing a new private key; and
   replacing the private key in the HSM with the new private key.

2. The method of claim 1, wherein the security token comprises a JSON web token (JWT).

3. The method of claim 2, wherein the digital signature comprises a JSON Web Signature (JWS).

4. The method of claim 1, wherein the request includes or is generated from a public key.

5. The method of claim 1, further comprising automatically modifying the private key in the HSM.

6. The method of claim 1, wherein the digital signature is generated from an asymmetric cryptography algorithm using the private key.

7. The method of claim 6, wherein the asymmetric cryptography algorithm comprises at least one of Rivest-Shamir-Adleman (RSA®), Elliptic Curve Cryptography (ECC), or Digital Security Algorithm (DSA).

8. The method of claim 1, wherein the client comprises a first cloud service attempting to access the secure resource at a second cloud service hosted on a remote device.

9. The method of claim 1, wherein the secure resource comprises a file to be downloaded to the client.

10. The method of claim 1, wherein the access to the secure resource comprises a client assertion portion that is generated from the private key.

11. The method of claim 1, wherein the private key is not shared with the client.

12. The method of claim 1, wherein the private key is not shared outside of the HSM.

13. A method for authenticating a client to access a secure resource on a remote device, the method comprising:

receiving, at a secure vault, a security token comprising a client identifier associated with the client or a user of the client;

generating a digital signature from a private key stored in a hardware security module (HSM);

transmitting the digital signature to the client for the client to obtain an access token to a secure resource on a remote device;

determining to change the private key in the HSM;

issuing a new private key; and replacing the private key in the HSM with the new private key.

14. The method of claim 13, further comprising:

attaching the digital signature to the security token generated by the client; and creating a signed signature token for the client to obtain the access token.

15. The method of claim 13, wherein the digital signature comprises a JSON Web Signature (JWS).

16. The method of claim 13, wherein determining to change the private key in the HSM comprises at least one of:

waiting a predetermined period of time to change the private key in the HSM, and identifying an occurrence of a security condition.

17. The method of claim 13, further comprising rotating the private key in the HSM with the new private key without user interaction.

18. Computer-storage memory comprising executable instructions that cause one or more processors to perform operations for authenticating a client to access a secure resource on a remote device using a public key and a private key, wherein the private key is stored in a hardware security module (HSM) away from the client, the operations comprising:

storing the private key in the HSM;

receiving a request from the client for a digital signature to access the secure resource;

generating the digital signature using, in part, the private key in the HSM;

generating a security token using the digital signature;

authenticating the client to access a remote resource using the security token;

determining to change the private key in the HSM;

issuing a new private key; and replacing the private key in the HSM with the new private key.

19. The computer-storage memory of claim 18, the operations further comprising:

incident to receiving the security token, transmitting an access token to a remote device.

20. The computer-storage memory of claim 18, wherein the HSM is not accessible by the client.

\* \* \* \* \*